United States Patent
Henry

(10) Patent No.: US 7,835,020 B2
(45) Date of Patent: Nov. 16, 2010

(54) DATA TRACKING

(75) Inventor: Steven G. Henry, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2432 days.

(21) Appl. No.: 10/455,002

(22) Filed: Jun. 5, 2003

(65) Prior Publication Data

US 2005/0007624 A1    Jan. 13, 2005

(51) Int. Cl.
*G06F 3/12* (2006.01)
*G06F 7/00* (2006.01)
*G06F 12/00* (2006.01)
*H04N 1/00* (2006.01)

(52) U.S. Cl. .............. 358/1.15; 709/609; 709/821; 358/402

(58) Field of Classification Search ............ 358/1.15, 358/402; 707/200, 205, 609, 821
See application file for complete search history.

(56) References Cited

U.S. PATENT DOCUMENTS

| | | | |
|---|---|---|---|
| 6,248,996 B1 | 6/2001 | Johnson et al. | |
| 6,618,749 B1* | 9/2003 | Saito et al. | 709/207 |
| 6,658,000 B1* | 12/2003 | Raciborski et al. | 370/386 |
| 6,684,368 B1* | 1/2004 | Hull et al. | 715/500 |
| 2002/0101597 A1 | 8/2002 | Hoover | |
| 2002/0106103 A1 | 8/2002 | Jones et al. | |
| 2004/0032624 A1* | 2/2004 | Stevens et al. | 358/402 |

* cited by examiner

*Primary Examiner*—Mark K Zimmerman
*Assistant Examiner*—Neil R McLean

(57) ABSTRACT

Methods and apparatus for tracking a data file corresponding to printed material scanned into a digital transmitter are provided. A database is searched for a tracking number contained in the data file to determine whether the data file is stored in the database. A confirmation message is sent indicating that the data file has been stored in the database upon locating the tracking number. An error message is sent indicating that the data file has not been stored in the database when the tracking number cannot be found in the database.

10 Claims, 4 Drawing Sheets

DATA TRACKING

FIELD OF THE INVENTION

The present invention relates generally to data tracking.

BACKGROUND

Digital transmitters, such as digital senders, digital network copiers, multi-function peripherals, etc., convert printed material, e.g., paper documents, into digital data to be sent to various predefined destinations, e.g., electronic mail (email) addresses, facsimile (fax) destinations (e.g., via LAN fax, Internet fax, etc.), network printers, personal computers, databases on a network storage devices, such as document management systems, workflow systems, etc., or other data receiving devices. Digital transmitters normally include a scanner for scanning in the printed material for subsequent conversion into digital data by the digital transmitter.

For many applications, digital transmitters convert the data into a data file, e.g., a formatted data file, such as Portable Document Format (PDF), Tag Image File Format (TIFF), Joint Photographic Experts Group (JPEG), or other data format. The data file is often sent to a database, such as a document-management database or a workflow database, where software, such as document-management or workflow software usually files the data file.

Typically, a significant amount of processing occurs between the time that printed material is scanned and a data file corresponding to the printed material is stored in a database. During processing, a number of failures can occur that are not usually apparent to the person who initially scanned the printed material. Some of these failures include network connection failures, failures in subsequent computer or human processing steps, accidental loss of data, etc. Currently, there is no way for tracking data files during processing to determine if a failure has occurred and for confirming whether the data files were stored in the correct folder (or directory) of the database other than physically searching the database folder. Physically searching database folders can be time consuming and is often performed a long time after the data file was sent, for example, when it is desired retrieve the data file.

SUMMARY

One embodiment of the present invention provides a method for tracking a data file corresponding to printed material scanned into a digital transmitter. The method includes searching a database for a tracking number contained in the data file to determine whether the data file is stored in the database. Sending a confirmation message indicating that the data file has been stored in the database upon locating the tracking number is included in the method, as is sending an error message indicating that the data file has not been stored in the database when the tracking number cannot be found in the database.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
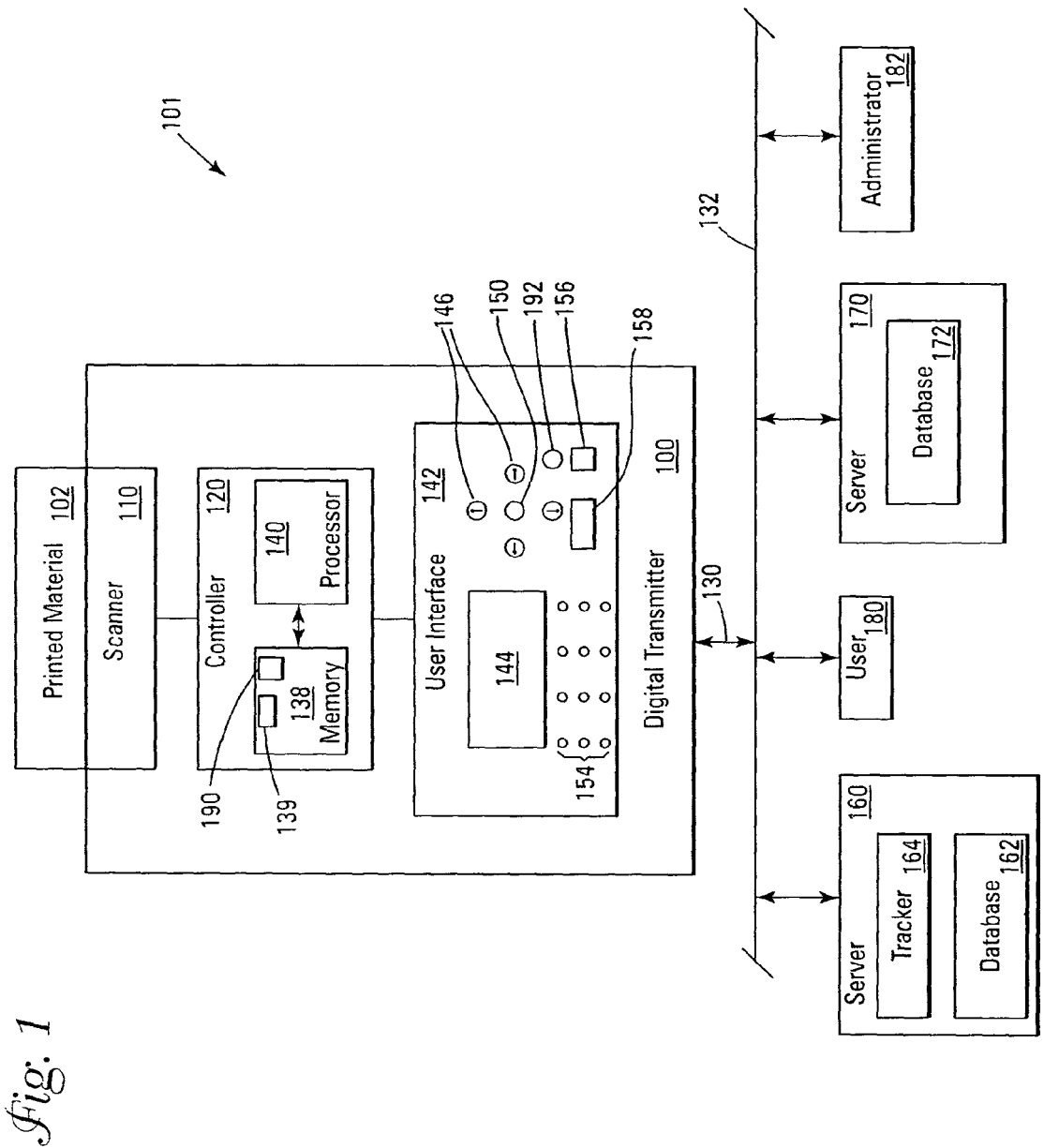
FIG. 1 is a block diagram illustrating a setup for implementing document tracking according to an embodiment of the present invention.

FIG. 1 is a block diagram illustrating a setup 101 for implementing document tracking according to an embodiment of the present invention. Setup 101 includes a digital transmitter 100, such as a digital sender, digital network copier, multi-function peripheral, etc. Digital transmitter 100 includes a scanner 110 connected to a controller 120. Scanner 110 converts printed material 102, e.g., printed documents, into digital data that are sent to controller 120.

For one embodiment, controller 120 is adapted to format the data received from scanner 110 into a bitmap format. For other embodiments, controller 120 converts the data into a formatted data file, such as Portable Document Format (PDF), Tag Image File Format (TIFF), Joint Photographic Experts Group (JPEG), or other data format, for example, from the bitmap format. For one embodiment, controller 120 is adapted to transmit digital data corresponding to printed material 102, e.g., as a formatted data file, a bitmap, etc., via an interface 130 to a data network 132. For one embodiment, data network 132 is a Local Area Network, the Internet, or the like, and interface 130 is a network adaptor (or network interface card).

For another embodiment, a data file, e.g., a formatted data file, corresponding to printed material 102 is sent to a database 162 of a server 160 that is connected to data network 132 and/or a database 172 of a server 170 that is connected to data network 132. For some embodiments, databases 162 and 172 are document-management or workflow databases, and servers 160 and 170 respectively include computer-readable instructions for causing the data file to be stored in a folder (or directory) of database 162 and/or 172. The folder can be pre-designated at digital transmitter 100 or selected by server 160 or 170.

Controller 120 includes a memory 138, e.g., a computer-usable storage media that can be fixedly or removably attached to digital transmitter 100. Some examples of computer-usable media include static or dynamic random access memory (SRAM or DRAM), read-only memory (ROM), electrically-erasable programmable ROM (EEPROM or flash memory), magnetic media and optical media, whether permanent or removable. Memory 138 may include more than one type of computer-usable media for storage of differing information types.

In various embodiments, memory 138 stores digital data received from scanner 110 for subsequent formatting by controller 120. For another embodiment, memory 138 contains computer-readable instructions, e.g., drivers, adapted to cause a processor 140 of controller 120 to format the data received from scanner 110 and computer-readable instructions to cause processor 140 to cause digital transmitter 100 to perform various methods, as described below. For some embodiments, memory 138 includes a database 139, such as a document-management or workflow database, and the computer readable instructions cause the data file corresponding to printed material 102 to be stored in a folder on database 139. The folder can be pre-designated or selected by the computer readable instructions.

For one embodiment, digital transmitter 100 includes a user interface 142. User interface 142 includes a display 144. For some embodiments, user interface 142 includes directional keys 146 for navigating display 144, e.g., for highlighting one or more icons (not shown) on display 144, and a select button 150 for selecting the highlighted icons. For one embodiment, display 144 and thus the icons 160 are touch-sensitive. User interface 142 can also include a keyboard 154, such as an alphanumeric keyboard, and a scan button 156 for causing digital transmitter 100 to scan printed material 102.

For another embodiment, processor 140 creates an information file that includes information about the data file corresponding to printed material 102, such as an identity of a user who scanned in printed material 102, a time and/or date that the data file was created, keywords about the scanned document, an address of a pre-designated folder for storing the data file, etc. For one embodiment, the information file is a job envelope file that goes around the data file. For various embodiments, the information file is a text file. For some embodiments, the user inputs the keywords via keyboard 154, while the time and/or date information is supplied by digital transmitter 100 and the user's identity is either input by the user or supplied by digital transmitter 100 based on the user's login information, e.g., user's username and/or password. The pre-designated folder address can be entered using keyboard 154, selected from a menu on display 144, etc.

For some embodiments, digital transmitter sends the information file to server 160 and/or 170 along with the data file corresponding to printed material 102, and the computer-readable instructions of the respective server cause the information file to be stored in a folder of database 162 of server 160 and/or database 172 of server 170. For one embodiment, the information file and the data file corresponding to printed material 102 are sent to database 139 of memory 138, and the computer-readable instructions of memory 138 cause the information file to be stored in a folder of database 139. The information file and the data file corresponding to printed material 102 can be stored in the same folder or different folders of the respective database. For some embodiments, the data file corresponding to printed material 102 is stored in a folder based on the keywords in the information file or in the pre-designated folder based on the address for the pre-designated folder in the information file.

Figure 2:
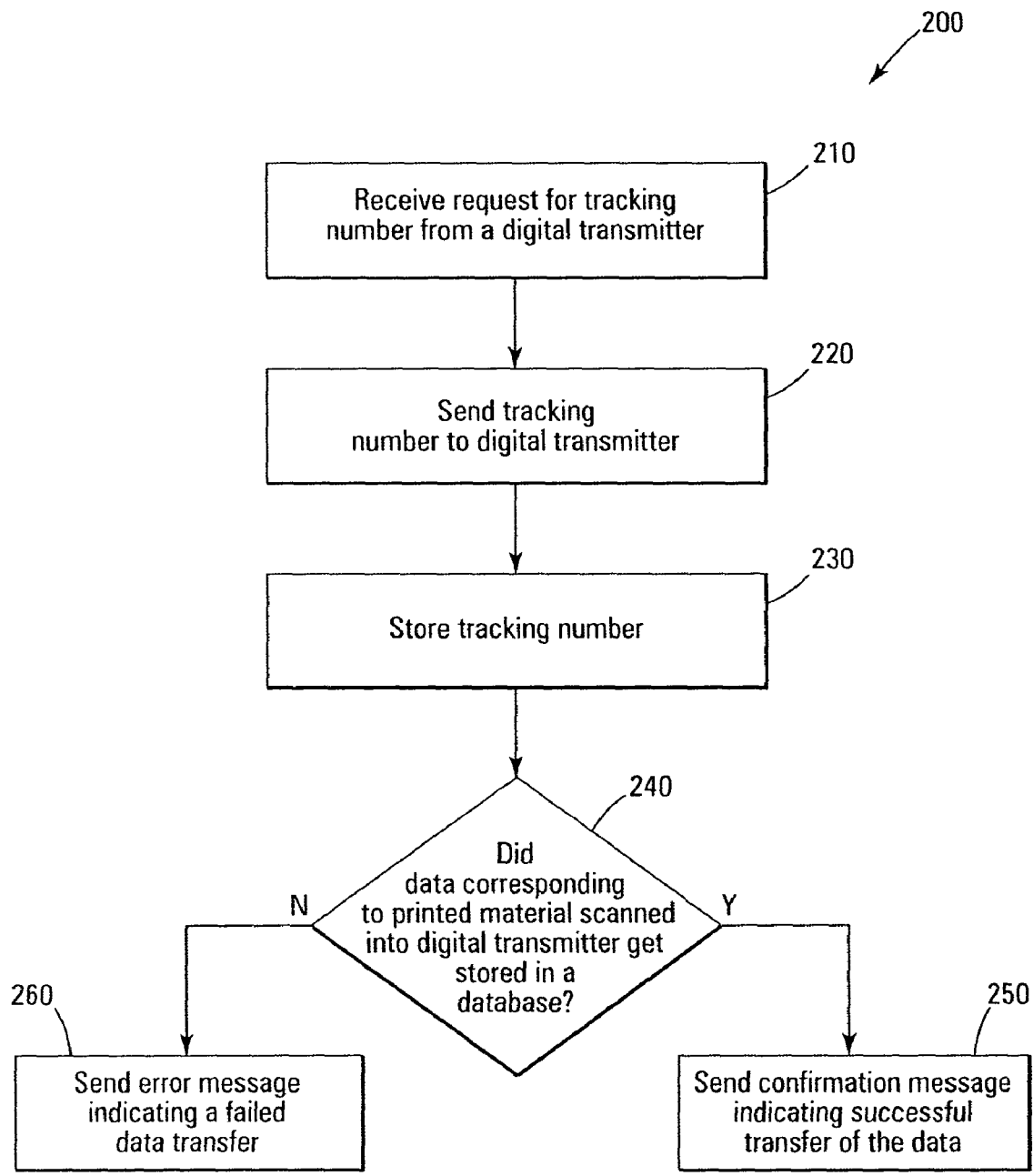
FIG. 2 is a flowchart of a method performed by a server of FIG. 1 according to another embodiment of the present invention.

For one embodiment, server 160 includes a tracker 164 for tracking the data file corresponding to printed material 102. Tracker 164 includes computer-readable instructions adapted to cause server 160 perform a method 200, as illustrated by a flowchart in FIG. 2. For one embodiment, the computer-readable instructions are contained on a computer-usable storage media that can be fixedly or removably attached to server 160. Some examples of computer-usable media include static or dynamic random access memory (SRAM or DRAM), read-only memory (ROM), electrically-erasable programmable ROM (EEPROM or flash memory), magnetic media and optical media, whether permanent or removable.

At block 210, server 160 receives a request for a tracking number from digital transmitter 100. For one embodiment, the request includes the user's email address that can be entered by the user, selected by digital transmitter 100 from a list of email addresses based on the user's login information, etc. For another embodiment, the request may also include additional information about the file data file corresponding to printed material 102, such as an identity of the user, the time and/or date that the data file was created, keywords, the address of the pre-designated folder, etc. For some embodiments, the request includes an email address a system administrator that can be entered by the user or system administrator, selected by digital transmitter 100, etc. In another embodiment, the request includes an address of a website (not shown) located on data network 132 that can be entered by the user or system administrator, selected by digital transmitter 100, etc.

Server 160 sends the tracking number to digital transmitter 100 at block 220 and stores the tracking number on server 160 at block 230. For one embodiment, server 160 stores the request for the tracking number. For another embodiment, the tracking number is sequentially selected from a list of available tracking numbers. It will be appreciated by those skilled in the art that a variety of different tracking number selection and management schemes can be employed.

Server 160 determines whether the data file corresponding to printed material 102 was stored in database 162 and/or database 172, at decision block 240. For one embodiment, server 160 checks folders of database 162 and/or database 172 to accomplish this. In particular, server 160 searches for a data file containing the tracking number. For one embodiment, the tracking number is embedded in data corresponding to printed material 102, e.g., in data corresponding to each page of a multi-page document, and server 160 searches this data for the tracking number, by comparing the data to the tracking number.

If the tracking number is found, e.g., if data of a data file matches the tracking number, it is determined that the data file corresponding to printed material 102 was stored in database 162 and/or database 172, and at block 250, server 160 sends a confirmation message, e.g., to the user who scanned printed material 102, and/or the system administrator, indicating that the data file corresponding to printed material 102 was successfully transferred to database 162 and/or database 172. For one embodiment, this involves emailing the confirmation message to a computer 180 of the user who scanned printed material into digital transmitter 100 and/or to a computer 182 of the system administrator.

For some embodiments, server 160 records the address of the data file corresponding to printed material 102, and the confirmation message provides the user with that address. This may occur for situations where server 160 stores the data file at a particular location in data base 162 and/or server 170 stores the data file at a particular location in data base 172 without user intervention, for example, based on a keyword contained in the information file corresponding to the data file or the like. For other embodiments, server 160 reads when, e.g., date and/or time, the data file was stored in database 162 and/or database 172, e.g., from the data file properties, and includes this information in the confirmation message.

If server 160 cannot find a data file containing the tracking number, it is determined that the data file corresponding to printed material 102 was not stored in database 162 and/or database 172, and at block 260, server 160 sends an error message indicating a failed data transfer, i.e., that the data file was not successfully transferred to database 162 and/or database 172. For one embodiment, the error message is sent, e.g., by email, to a computer 182 of a system administrator and/or computer 180 of the user.

For various embodiments, either the error message or the confirmation message is sent to the website on data network 132. For these embodiments, the user and/or the administrator goes to the website to view and/or download the error message or the confirmation message.

For some embodiments, the tracking number request includes an address of the pre-designated folder for storing the data file. Server 160 stores the tracking number and the address, e.g., on server 160. For one embodiment, server 160 stores the address in a tracking file having the tracking number as the filename. For these embodiments, server 160 determines whether the data file corresponding to printed material 102 was stored in the correct folder (i.e., the pre-designated folder) at decision block 240 by searching, in the manner described above, for the tracking number in the pre-designated folder. If the tracking number is found within the pre-designated folder, method 200 proceeds to block 250, where a confirmation message is sent to the user indicating that the data file corresponding to printed material 102 was successfully transferred to the correct folder. If server 160 cannot find a data file containing the tracking number in the pre-designated folder, server 160 sends an error message at block 260 indicating a failed data transfer, i.e., that the data file was not successfully transferred to the correct folder.

For another embodiment, server 160 waits for a first predetermined time interval before searching for the data file containing the tracking number. For one embodiment, the first predetermined time interval is at least as long as a processing time required to image process printed material 102 into a data file, send the data file to a variety of intermediate processing steps that may include human operators adding information to the document, etc.

For other embodiments, server 160 periodically searches for the data file containing the tracking number. That is, each of a predetermined number of searches is performed periodically at the end of a second predetermined time interval. If server 160 cannot find the data file containing the tracking number after performing the predetermined number of searches, it is determined that the data file corresponding to printed material 102 was not stored in database 162 and/or database 172 or in the correct folder of database 162 and/or database 172.

For one embodiment, the time it takes to perform the predetermined number of searches is the first predetermined time interval. For this embodiment, either an intermediate error message or a confirmation message is emailed to the user and/or to the system administrator or to the website after each of the second time intervals, depending on the outcome of the search. If server 160 cannot find the data file containing the tracking number after performing the predetermined number of searches, a final error message is sent. For another embodiment, the second predetermined time interval is the same as the first predetermined time interval. For various embodiments, the user or the system administrator can configure the first predetermined time interval, the second predetermined time interval, and/or the predetermined number of searches.

For another embodiment, determining whether the data file corresponding to printed material 102 was stored in database 172 involves server 160 sending a message to server 170 requesting that server 170 search database 172, or the pre-designated folder thereof, for the tracking number. Upon receiving the message, computer-readable instructions contained on a computer-usable storage media that can be fixedly or removably attached to server of server 170 cause server 170 to search database 172, or the pre-designated folder thereof, for the tracking number. Some examples of computer-usable media include static or dynamic random access memory (SRAM or DRAM), read-only memory (ROM), electrically-erasable programmable ROM (EEPROM or flash memory), magnetic media and optical media, whether permanent or removable.

For one embodiment, the message from server 160 includes the tracking number or the tracking number and the address of the pre-designated folder. For another embodiment, server 160 sends the message after the first predetermined time interval described above. For some embodiments, server 170 compares the tracking number to data contained in database 172. If the tracking number is found, e.g., if data of a data file matches the tracking number, it is determined that the data file corresponding to printed material 102 was stored in database 172. Moreover, if the tracking number is found in the pre-designated folder, it is determined that the data file corresponding to printed material 102 was stored in the correct folder. Server 170 then sends a message to server 160 indicating that the data file corresponding to printed material 102 was stored in database 172 or that the data file corresponding to printed material 102 was stored in the correct folder of database 172. Method 200 then proceeds to step 250, which is described above. If the tracking number is not found, server 170 sends a message to server 160 indicating that the data file corresponding to printed material 102 is not found. Method 200 then proceeds to step 260, which is described above.

For some embodiments, server 160 sends each of a predetermined number of messages to server 170 periodically at the end of the second predetermined time interval described above. If server 170 cannot find the data file containing the tracking number after sending the predetermined number of messages, it is determined that the data file corresponding to printed material 102 was not stored in database 172 or the data file was not stored in the correct folder, and the method proceeds to block 260.

For one embodiment, the predetermined number of messages spans a time that is the same as the first predetermined time interval. For this embodiment, server 170 sends a message after each of the second time intervals to server 160 instructing server 160 to send an intermediate error message or a confirmation message to the user and/or to the system administrator or to the website after each of the second time intervals, depending on the outcome of the search. If the data file containing the tracking number is not found after performing the predetermined number of searches, a final error message is sent. For another embodiment, the second predetermined time interval is the same as the first predetermined time interval.

Figure 3:
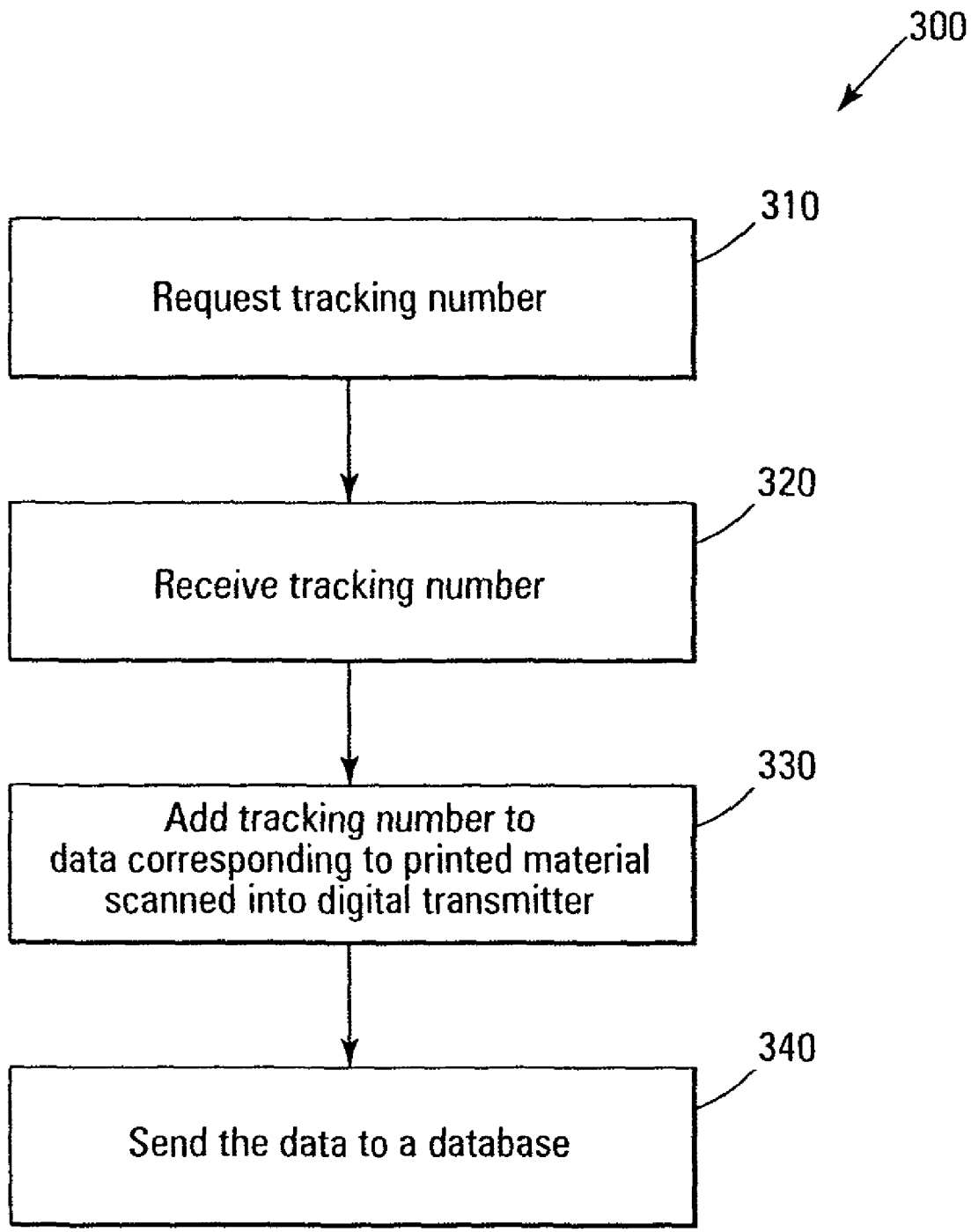
FIG. 3 is a flowchart of a method performed by a digital transmitter of FIG. 1 according to another embodiment of the present invention.

For one embodiment, memory 138 of digital transmitter 100 contains computer-readable instructions for causing digital transmitter to perform a method 300, as illustrated by a flowchart in FIG. 3. At block 310, digital transmitter 100 requests the tracking number from server 160. For one embodiment, digital transmitter 100 requests the tracking number in response to the user logging onto digital transmitter 100. For another embodiment, the tracking number is requested in response display 144 prompting the user to request the tracking number, and the user electing to request the tracking number by selecting an icon on display 144, pressing a button 158 of user interface 142, etc. For another embodiment, display 144 prompts the user to request the tracking number upon logging onto digital transmitter 100, upon electing to scan printed material 102, after scanning printed material 102, etc.

For one embodiment, requesting the tracking number includes sending the address of the pre-designated folder in database 162 and/or database 172 for storing the data file corresponding to printed material 102 to server 160. For one embodiment, the user inputs the address using keyboard 154, selects the address from a menu on display 144, etc. For another embodiment, display 144 prompts the user to input the address upon logging onto digital transmitter 100, upon electing to scan printed material 102, after scanning printed material 102, etc.

Digital transmitter 100 receives the tracking number from server 160 at block 320. For one embodiment, display 144 displays the tracking number upon receipt of the tracking number. At block 330, digital transmitter 100 adds the tracking number to the data file corresponding to printed material 102. For one embodiment, this involves embedding the tracking number in data corresponding to each page of a multi-page document. For another embodiment, the tracking number is also added to the information file for the data file corresponding to printed material 102. At block 340, digital transmitter 100 sends the data file to database 162 and/or database 172 or sends the data file and the information file to database 162 and/or database 172. For one embodiment, this is in response to the user electing to send the data file, e.g., by selecting an icon from display 144 in response to being prompted by display 144 to send the data file.

Figure 4:
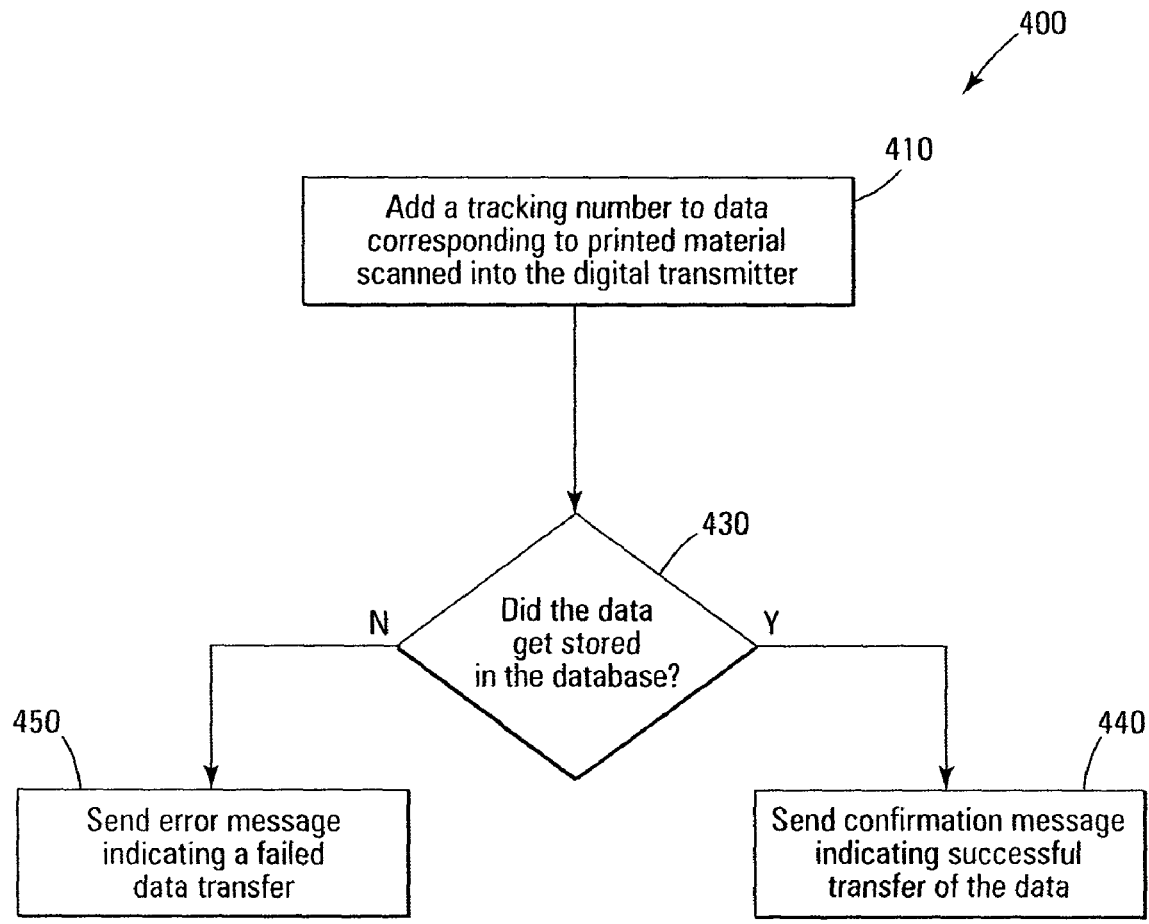
FIG. 4 is a flowchart of a method performed by a digital transmitter of FIG. 1 according to yet another embodiment of the present invention.

For another embodiment, a tracker 190 is included in memory 138 of digital transmitter 100. Tracker 190 includes computer-readable instructions for causing digital transmitter 100 to perform a tracking method 400, as illustrated by a flowchart in FIG. 4. At block 410, a tracking number is added to the data file corresponding to printed material 102. For one embodiment, this is as described above for block 330 of FIG. 3.

For one embodiment, the tracking number is added to the data file corresponding to printed material 102 in response to the user logging onto digital transmitter 100. For another embodiment, the tracking number is added in response display 144 prompting the user to add the tracking number, and the user electing to add the tracking number by selecting an icon on display 144, pressing a button 192 of user interface 142, etc. For another embodiment, display 144 prompts the user to add the tracking number upon logging onto digital transmitter 100, upon electing to scan printed material 102, after scanning printed material 102, etc.

For one embodiment, digital transmitter 100 sends the data file to database 172 and/or stores the data file in database 139 of digital transmitter 100. For another embodiment, digital transmitter 100 sends the data file and the information file to database 172 and/or stores the data file and the information file in database 139 of digital transmitter 100.

Digital transmitter 100 determines whether the data file corresponding to printed material 102 was stored in database 139 and/or database 172, at decision block 430. For one embodiment, digital transmitter 100 checks folders of database 139 and/or database 172 to accomplish this. In particular, digital transmitter 100 searches for a data file containing the tracking number. For one embodiment, digital transmitter 100 searches for the tracking number, by comparing the data of the data file to the tracking number.

If the tracking number is found, e.g., if data of a data file matches the tracking number, it is determined that the data file corresponding to printed material 102 was stored in database 139 and/or database 172, and at block 440, digital transmitter 100 sends a confirmation message, e.g., to the user who scanned printed material 102 and/or the system administrator or the website, indicating that the data file corresponding to printed material 102 was successfully transferred to database 139 and/or database 172. For one embodiment, this involves emailing the message to computer 180 and/or computer 182 or to the website on data network 132.

For some embodiments, digital transmitter 100 records the address of the data file corresponding to printed material 102, and the message provides the user with that address. This may occur for situations where digital transmitter 100 stores the data file at a particular location in database 139 and/or server 170 stores the data file at a particular location in data base 172 without user intervention, for example, based on a keyword contained in the information file corresponding to the data file or the like. For other embodiments, digital transmitter 100 reads when, e.g., date and/or time, the data file was stored in database 139 and/or database 172, e.g., from the data file properties, and includes this information in the message.

If digital transmitter 100 cannot find a data file containing the tracking number, it is determined that the data file corresponding to printed material 102 was not stored in database 139 and/or database 172, and at block 450, digital transmitter 100 sends an error message indicating a failed data transfer, i.e., that the data file was not successfully transferred to database 139 and/or database 172. For one embodiment, the error message is sent, e.g., by email, to computer 182 of a system administrator and/or computer 180 of the user or is sent to the website on data network 132.

For one embodiment, the user inputs an address of a pre-designated folder of database 139 and/or database 172 for storing the data file corresponding to printed material 102 address using keyboard 154, selects the address from a menu on display 144, etc. For another embodiment, display 144 prompts the user to input the address upon logging onto digital transmitter 100, upon electing to scan printed material 102, after scanning printed material 102, etc. For these embodiments, digital transmitter 100 determines whether the data file corresponding to printed material 102 was stored in the correct folder (or the pre-designated folder) at decision block 430 by searching, in the manner described above, for the tracking number in the pre-designated folder. If the tracking number is found within the pre-designated folder, method 400 proceeds to block 440, where a confirmation message is sent to the user indicating that the data file corresponding to printed material 102 was successfully transferred to the correct folder. If digital transmitter 100 cannot find a data file containing the tracking number in the pre-designated folder, digital transmitter 100 sends an error message indicating a failed data transfer, i.e., that the data file was not successfully transferred to the correct folder, at block 450.

For another embodiment, digital transmitter 100 waits for the first predetermined time interval described above before searching for the data file containing the tracking number. For other embodiments, digital transmitter 100 periodically searches for the data file containing the tracking number. That is, each of a predetermined number of searches is performed periodically at the end of the second predetermined time interval described above. If digital transmitter 100 cannot find the data file containing the tracking number after performing the predetermined number of searches, it is determined that the data file corresponding to printed material 102 was not stored in database 139 and/or database 172 or in the correct folder of database 139 and/or database 172.

For one embodiment, the time it takes to perform the pre-determined number of searches is the first predetermined time interval. For this embodiment, either an intermediate error message or a confirmation message is emailed to the user and/or to the system administrator or to the website after each of the second time intervals, depending on the outcome of the search. If digital transmitter 100 cannot find the data file containing the tracking number after performing the predetermined number of searches, a final error message is sent. For another embodiment, the second predetermined time interval is the same as the first predetermined time interval.

For another embodiment, determining whether the data file corresponding to printed material 102 was stored in database 172 involves digital transmitter 100 sending a message to server 170 requesting that server 170 search database 172, or the pre-designated folder thereof, for the tracking number. Upon receiving the request, the computer-readable instructions of server 170 cause server 170 to search database 172, or the pre-designated folder thereof, for the tracking number. For one embodiment, the request from digital transmitter 100 includes the tracking number or the tracking number and the address of the pre-designated folder. For another embodiment, digital transmitter 100 sends the request after the first predetermined time interval described above.

For some embodiments, server 170 compares the tracking number to data contained in database 172. If the tracking number is found, e.g., if data of a data file matches the tracking number, it is determined that the data file corresponding to printed material 102 was stored in database 172. Moreover, if the tracking number is found in the pre-designated folder, it is determined that the data file corresponding to printed material 102 was stored in the correct folder. Server 170 then sends a message to digital transmitter 100 indicating that the data file corresponding to printed material 102 was stored in database 172 or that the data file corresponding to printed material 102 was stored in the correct folder of database 172. Method 400 then proceeds to step 440, which is described above. If the tracking number is not found, server 170 sends a message to digital transmitter 100 indicating that the data file corresponding to printed material 102 is not found. Method 400 then proceeds to step 450, which is described above.

For some embodiments, digital transmitter 100 sends each of a predetermined number of requests to server 170 periodically at the end of the second predetermined time interval described above. If server 170 cannot find the data file containing the tracking number after sending the predetermined number of requests, it is determined that the data file corresponding to printed material 102 was not stored in database 172 or the data file was not stored in the correct folder, and method 400 proceeds to block 450.

For one embodiment, the predetermined number of messages spans a time that is the same as the first predetermined time interval. For this embodiment, server 170 sends a message after each of the second time intervals to digital transmitter 100 instructing digital transmitter 100 to send an intermediate error message or a confirmation message to the user and/or to the system administrator or to the website after each of the second time intervals, depending on the outcome of the search. If the data file containing the tracking number is not found after performing the predetermined number of searches, a final error message is sent. For another embodiment, the second predetermined time interval is the same as the first predetermined time interval.

Method 400, as described above, can also be used to track the data file corresponding to printed material 102 when the data file is sent to server 160 or any number of servers on data network 132.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A method for tracking a data file corresponding to printed material scanned into a digital transmitter, the method comprising:
    searching a database for a tracking number embedded in the data file to determine whether the data file is stored in the database;
    sending a confirmation message indicating that the data file has been stored in the database upon locating the tracking number; and
    sending an error message indicating that the data file has not been stored in the database when the tracking number cannot be found in the database;
    wherein the data file is an image data file of digital image data that is converted from the printed material scanned into the digital transmitter.

2. The method of claim 1, wherein searching a database for a tracking number comprises comparing data of the data file to the tracking number.

3. The method of claim 1, wherein locating the tracking number comprises matching data of the data file to the tracking number.

4. The method of claim 1, wherein sending the confirmation message comprises at least one of emailing the confirmation message to a user who scanned in the printed material, emailing the confirmation message to a system administrator, and sending the confirmation message to a website.

5. The method of claim 1, wherein sending the error message comprises at least one of emailing the error message to a user who scanned in the printed material, emailing the error message to a system administrator, and sending the error message to a website.

6. The method of claim 1, wherein searching a database for a tracking number comprises searching at least one of a database on a server on a data network and a database in the digital transmitter.

7. The method of claim 1, wherein searching a database for a tracking number comprises searching a pre-designated folder of at least one of a database on a server on a data network and a database in the digital transmitter to determine whether the data file is stored in the pre-designated folder.

8. The method of claim 1, wherein searching a database comprises at least one of the digital transmitter and a network server searching the database.

9. The method of claim 1, wherein sending a confirmation message comprises sending a confirmation message including at least one of when the data file was stored in the database and an address of the data file.

10. The method of claim 1, wherein searching a database comprises at least one of waiting for a predetermined time interval before searching the database and searching the database a predetermined number of times.

* * * * *